(12) United States Patent
Stram

(10) Patent No.: US 6,216,446 B1
(45) Date of Patent: Apr. 17, 2001

(54) VALVELESS PULSE-JET ENGINE WITH FORWARD FACING INTAKE DUCT

(76) Inventor: Michael A. Stram, 2821 S. Hillock Ave., Chicago, IL (US) 60608

( * ) Notice: Subject to any disclaimer, the term of this patent is extended or adjusted under 35 U.S.C. 154(b) by 0 days.

(21) Appl. No.: 09/350,696

(22) Filed: Jul. 9, 1999

(51) Int. Cl.[7] .................................................... F02K 7/02

(52) U.S. Cl. ............................... 60/249; 60/269

(58) Field of Search ................... 60/39.76, 39.77, 60/247, 249, 269

(56) References Cited

U.S. PATENT DOCUMENTS

| | | | |
|---|---|---|---|
| 2,663,142 | * 12/1953 | Wilson | 60/269 |
| 2,709,891 | * 6/1955 | Dunbar et al. | 60/249 |
| 3,035,413 | * 5/1962 | Linderoth | 60/39.77 |
| 3,514,956 | * 6/1970 | Bray | 60/269 |
| 3,768,257 | * 10/1973 | Neuffer | 60/269 |

* cited by examiner

Primary Examiner—Louis J. Casaregola

(57) ABSTRACT

A self-starting, self-aspirating valveless jet engine comprising a combustor tube, a multiple tube intake duct, a flame holder, and a fuel supply means. High throttle capability has been achieved through the use of an intake duct consisting of multiple tubes, the intake duct being located on a common longitudinal axis with the combustor tube, and the inlet mouth of each intake tube in the intake duct facing forward in the direction of flight. A unique intake duct design succeeds in blocking all backflow of combustion gases during the combustion cycle, permitting the intake duct to be mounted facing the direction of flight. Intake tube inlet mouths that face forward in the direction of flight, maximize capture of ram air during flight, providing more air in the fuel to raise the fuel feed rate with a resulting increase in thrust. Blocking of all backflow gases increases thrust in another way, by increasing the buildup of pressure in the combustion chamber during the combustion process. Because the intake duct is on a common longitudinal axis with the combustor tube, engines of this invention are easily mounted to aircraft structures. The engines are capable of operating on a variety of fuels, including: liquified gaseous fuels such as propane and butane, vaporized volatile hydrocarbons such as gasoline and kerosene, liquid hydrocarbon mists such as atomized gasoline and kerosene, and combinations thereof. Engines of this invention are capable of throttling two to three times higher than previously known valveless jet engines of the prior art, they develop both high static thrust and high dynamic thrust, and have both the characteristics of valveless jets and ram jets.

8 Claims, 3 Drawing Sheets

VALVELESS PULSE-JET ENGINE WITH FORWARD FACING INTAKE DUCT

BACKGROUND OF THE INVENTION

1. Field of the Invention

This invention relates to tubular jet engines and pulse-jet engines of the valveless type, and more particularly to those that are capable of being throttled, easily self-starting without the use of auxiliary air, and self-aspirating. These engines typically consist of a combustor tube and an intake duct delivering the fuel-air charge. The combustor tube generally consists of a combustion chamber closed at its forward end, connected through a reducing cone, to an exhaust tail tube of lesser diameter than the combustion chamber. The exhaust tail tube is open to the atmosphere at its aft end. These engines normally operate on liquified gaseous fuels, such as propane, or butane, or vaporized liquid hydrocarbon fuels such as gasoline or kerosene. Valveless engines that use a fuel mist or spray, such as an atomized gasoline liquid, have very limited throttle capability and are not self-starting.

2. Description of the Prior Art

Most valveless jet engines of the prior art have the intake duct extending from the combustion chamber or reducing cone of the engine at a 45–90 degree angle to the longitudinal axes formed by the combustion chamber, reducing cone, and the exhaust tail tube. The intake duct and its inlet mouth typically face to the rear of the engine. At these angles, the intake duct represents a protrusion from the longitudinal plane, making it difficult to mount these engines to airplane structures, especially the fuselage of an airplane.

The history of the valveless jet engines covers several techniques to block the backflow of combustion gases out the intake during the combustion cycle. These pressure reversals or shock waves during combustion are difficult to eleminate entirely. They cause instability in the intake, preventing fuel flow to the combustion chamber, and often ignite the fuel-air mixture in the intake duct before it gets to the combustion chamber, resulting in total operating failure. They are also a cause of reduced thrust, because they reduce pressure build-up in the combustion chamber. Common methods described in the prior art to reduce backflow include: extending the length of the intake duct; sonically tuning the intake frequency to the frequency of the exhaust tail tube; and employing novel concepts such as vortex valves, flow rectifiers, or inertia tubes. None of these methods so far has resulted in complete blocking of the backflow, sufficient to be able to mount the intake duct on the front face of the combustion chamber with the inlet mouth of the intake duct facing forward in the direction of flight. One such engine with an intake duct mounted on the front face of the combustion chamber, the SNECMA valveless pulse-jet, known as the "Escopette," has the mouth of the duct turned back 180 degrees, so it faces the same direction as the exhaust tail tube, conserving the backflow for thrust. Another SNECMA engine, the "Ecrevisse," turns back the reducing cone 180 degrees so the intake duct and the exhaust tail tube face in the same direction. To achieve the same objective, another inventor turns back the exhaust tail tube 180 degrees. In U.S. Pat. No. 3,823,554, the inventor aligns the intake duct on a common longitudinal axis with the combustor tube and has the intake duct and inlet mouths facing directly aft in the same direction as the exhaust tail tube.

Mounting the intake duct on the front face of the combustor tube and on a common longitudinal axis with the combustor tube, and with the intake mouth facing the direction of flight, has several important benefits, among them, allowing ram air to enter the intake during flight, with a resultant increase in thrust and a reduction of specific fuel consumption. Almost all inventors of prior valveless jet engines have not been able to mount their intake ducts and intake inlet mouths facing forward, due to backflow of combustion gases out the intake duct. Instead, they have accepted a certain degree of spillage back through the intake duct, and have either turned back the intake duct 180 degrees to align the spillage flow with the exhaust tail, as mentioned above, or at least partly turned the intake duct back at an angle of 35–45 degrees to the axis formed by the combustion chamber and exhaust tube tail. Turning back the intake duct has the benefit of conserving the backflow of combustion gases through the intake duct for thrust, but it also eliminates the opportunity to maximize the positive effects of ram air to dramatically increase thrust and enrich the fuel charge with air. To obtain some benefits of ram air, inventors have employed scoops to redirect ram air into aft facing intake inlet mouths, or utilized forward facing scoops to direct ram air into an intake duct that is angled partly to the aft of the engine. Even with such scoops, it is not possible for engines of the prior art to realize the full benefits of ram air during flight. A forward facing intake duct aligned on a common axis with the combustor tube, and with the inlet mouth also facing forward in the direction of flight, achieves the highest air-fuel ratio during flight, and the greatest acceleration of the fuel-air charge to the combustion chamber. The advantage of having the fuel-air charge and combustion products all moving in one direction on a common longitudinal axis results in a dramatic improvement in thrust.

Another engine, the Gluhareff engine, specified in U.S. Pat.No. 3,093,962, handles backflow by allowing reverse pulses or shock waves caused by combustion gases to exit out the intake duct diffuser at a 90 degree angle to the axis of the combustor tube. At this angle, the exhaust gases exiting from the intake do not add to to the forward thrust of the engine, but reduce thrust by reducing pressure build-up in the engine. Although the Gluhareff invention has air scoops to realize some benefits from ram air, it is designed for mounting to, and driving helicopter blades; its bulky, long intake, mounted at 90 degrees to the combustor tube, make this engine very difficult to mount to the fuselage of an airplane.

It is worthy to note that there exists in the early prior art, several examples of valveless jet engines having the intake duct installed on the forward face of the combustor tube, and with the inlet mouth of the intake duct facing forward in the direction of flight. Namely, the Dunbar-Schubert engine, specified in U.S. Pat. No. 2,709,891, and the Bodine engine, specified in U.S. Pat. No. 2,731,795 are examples of such engines. These engines do not relate to the present invention because they are not self-starting, and their ability to be throttled is unknown. To start these engines, forward movement or auxiliary air is required. The Dunbar-Schubert engines also require a continuous supply of outside air to operate, which means they are not self-aspirating. Although both Dunbar-Schubert and Bodine claim their engines shunt off all blowback of combustion gases through their respective intakes, this inventor believes these engines do experience significant blowback of combustion gases. Both engines rely on adjusting the length of the intake duct in relation to the length of exhaust tail tube, otherwise known as sonic tuning, to eliminate backflow of combustion gases out the intake duct. However, extensive testing by this inventor as shown that this method leaves as much as 15% of the blowback unchecked, to exhaust out the intake duct. Even when the intake duct penetrates the combustion chamber, as discussed below, adjusting the intake duct length in relation to the length of the exhaust tail tube, or sonic tuning, does not eliminate all backflow of combustion gases out the intake duct. Due to their limitations, the Dunbar-Schubert and Bodine engines do not represent practical power sources for aircraft propulsion.

SUMMARY OF THE INVENTION

In view of these problems and others in the art, one of the objectives of this invention is to create an intake duct that can effectively block all backflow of combustion gases and thereby benefit from the increased build-up of pressure in the engine during combustion to cause greater thrust, and, due to the blocking of all backflow gases, make it possible to mount the intake duct on the front face of the engine on a common longitudinal axis with the combustor tube, and with the mouths of the intake duct facing forward in the direction of flight. With the intake duct in this position, the engine can be easily mounted to aircraft structures, and it can gain a maximum benefit from ram air during flight, to increase thrust and reduce fuel consumption.

Other objectives of this invention are:

To achieve higher fuel throttle settings during static operation by employing a multi-tube, multi-stage intake duct that adds air to the fuel charge in several stages.

To achieve higher fuel throttle settings over all prior valveless jet engines during dynamic operation by maximizing the air-enriching effect of ram air during forward flight.

To maximize the kinetic energy of the fuel-air mass and combustion products, to increase thrust by aligning the intake duct on a common longitudinal axis with the combustor tube.

To utilize the greater kinetic energy of the fuel-air mixture to increase the ability of the intake duct to block all backflow of the combustion products out the intake duct.

To create an intake duct that is entirely stable in operation, not subject to temporary shock reversals during the combustion cycle.

To create an engine that is capable of burning a variety of fuels, including: liquified gaseous fuels, such as propane, or butane; vaporized, highly volatile hydrocarbons, such a gasoline or kerosene, and hydrocarbon liquid mists, such as a gasoline or kerosene mist.

To create an engine that is easy to start, easy to restart, and capable of being fully throttled when employing all of the aforementioned fuels.

BRIEF DESCRIPTION OF THE DRAWINGS

The invention, both as to its organization and method of operation, together with further objectives and advantages, will be more fully understood by reference to the following detailed description and attached drawings accompanying the same.

In the drawings.

DETAILED DESCRIPTION OF THE INVENTION

Figure 1:
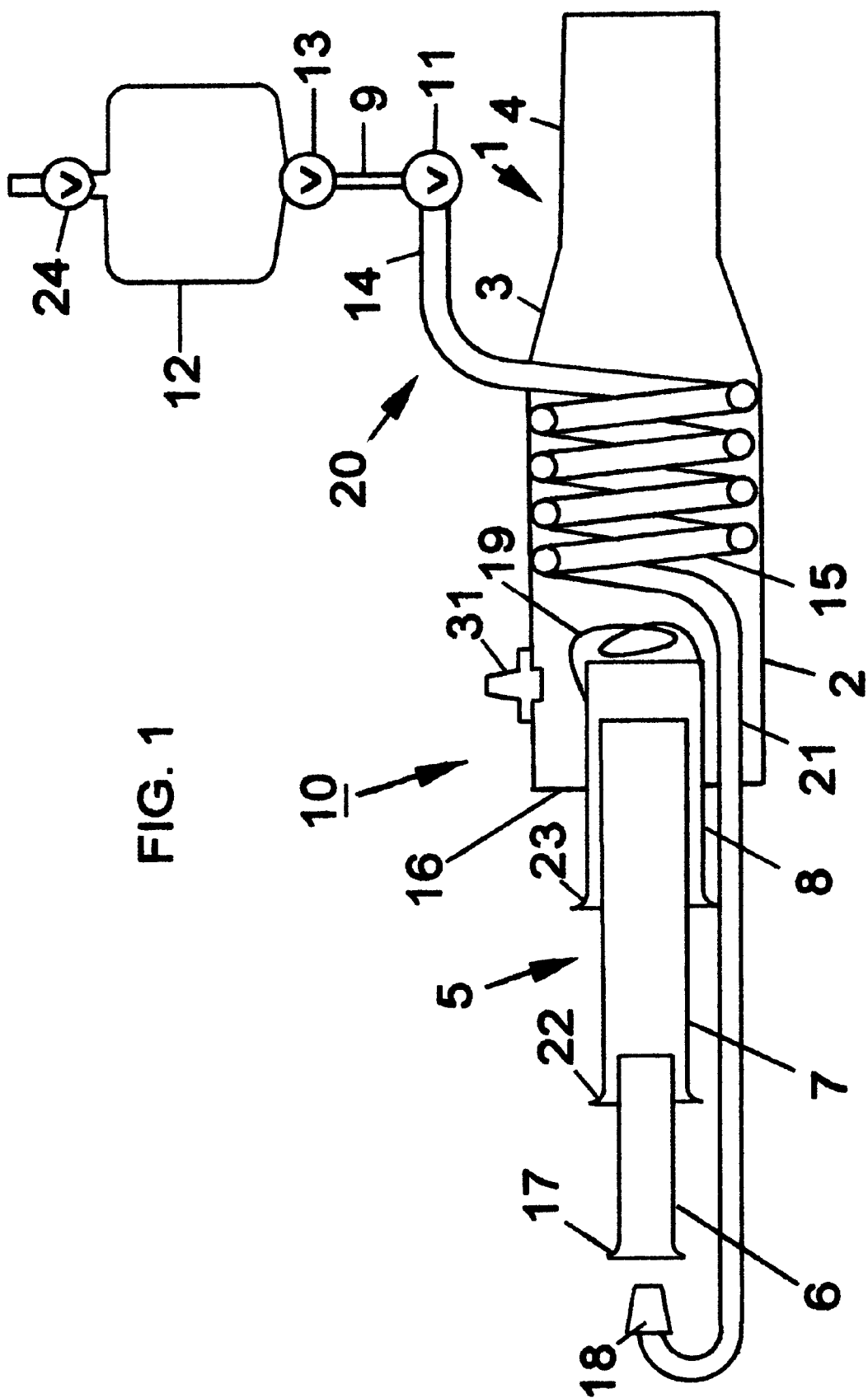
FIG. 1 is a longitudinal sectional view of an embodiment of the present invention, showing the complete jet engine.

Referring now to FIG. 1, there is illustrated a valveless jet engine 10, which is comprised of a cylindrical combustor tube 1, an intake duct 5, a fuel supply means 20, and a flame holder 19. The dimensions of the combustor tube are not critical to the success of the invention, with the exception that the general shape of the forward face of the combustion chamber should be flat or convex; flat is preferred. Combustor tubes of various dimensions have all been found to be successful, as long as the forward face of the combustion chamber is flat or convex, and the design of the intake duct and its dimensional relationship to the combustor tube, and the fuel supply means meet the requirements of this invention, as specified hereinafter. The combustor tube 1 consists of a cylindrical combustion chamber 2 having a flat forward face, communicating with a reducing cone 3, which is connected to an exhaust tail tube 4, said exhaust tail tube 4 being open at its aft end, and of lesser diameter than the combustion chamber 2. The combustor tube 1 is equipped with an intake duct 5, which consists of three intake tubes: The 1st stage intake tube 6 at the forward end of the intake duct 5 is inserted partially into the 2nd stage intake tube 7; said intake tube 7 extends into the engine, and is inserted inside the 3rd stage intake tube 8; said intake tube 8 also extends into the engine, and is integrally joined to forward face 16 of the combustion chamber 2. Intake tube 8 passes through the center of the forward face 16 of the combustion chamber 2, and is joined around its circumference to the combustion chamber 2. Intake tube 8 is the primary intake tube in the intake duct 5. For all embodiments of the invention, the last aft intake tube in the intake duct that is integrally joined to the combustion chamber is referred to as the primary intake tube. Intake tubes 6, 7, and 8 each have a flared inlet opening, facing in the direction of flight. The length of the intake tube 8 is approximately equal to the diameter of the combustion chamber 2, and its cross-section area is 40% of the cross-section area of the exhaust tail tube 4. I have found experimentally that the cross-section area of the 3rd stage intake tube 8, or the primary intake tube, can be as low as 25% of the cross-section area of the exhaust tail tube 4, and as high as 100% of the tail tube 4, but the preferred range is 35–65% of cross-section area of the exhaust tail tube 4. Intake tube 8 extends into the combustion chamber 2; its length inside the combustion chamber 2 is approximately equal to 50% of the diameter of the combustion chamber 2. The length of the 2nd stage intake tube 7 is 1.5 times the length of the intake tube 8, and its diameter is 85% of the diameter of the intake tube 8. Intake tube 7 passes through the center of the intake tube 8, and extends into the combustion chamber 2 to a length equal to 25% of the diameter of the combustion chamber 2. I have found expermentally that the length of the 2nd stage intake tube 7 may vary from 1.25–2 times the length of the 3rd stage intake tube 8, and its diameter must be in a range of 85–95% of the diameter of the 3rd stage intake tube 8. For successful operation, intake tube 7 must extend into the combustion chamber 2, its length inside the combustion chamber 2 must be equal to a minimum of 25% of the diameter of the combustion chamber 2, and no more than 37.5% of the diameter of the combustion chamber 2. The length of the 1st stage intake tube 6 is one-half of the length of the 2nd stage intake tube 7, and its diameter is smaller than the diameter of intake tube 7. Experimentally, I have found that the length of the 1st stage intake tube 6 may range from 0.5–1.0 times the length of the 2nd stage intake tube 7. The diametrical centers of intake tubes 6, 7, and 8 are in alignment, and this is a requirement for successful operation.

The embodiment engine 10 illustrated in FIG. 1. is configured to operate on a liquified gaseous fuels such as propane or butane. It is possible to configure the engine to operate on other fuels and fuel combinations as described hereinafter. The fuel supply means 20 for the illustrated engine 10 is comprised of a fuel tank 12, a conventional fuel fill valve 24, a fuel supply valve 13, leading to a fuel feed line 9, which draws liquid fuel from the bottom of the fuel tank 12, and is interrupted by a suitable throttle valve 11. The opposite side of the throttle valve 11 feeds into a vaporizer tube 14 that is larger in diameter than the fuel feed line 9. The vaporizer tube 14 penetrates to the interior of the engine 10 through a small hole in the combustion chamber 2, and then is coiled in the combustion chamber 2, to provide a series of superheated vaporizer coils 15. Coiling of the vaporizer tube 14 ends in a straight section 21 which which extends to the outside atmosphere through small hole in the front forward face 16 of the combustion chamber 2, and then continues to a point where it is turned back 180 degrees to face the flared mouth 17 of the 1st stage intake tube 6. The end of the vaporizer tube 14 is fitted with a supersonic fuel nozzle 18 common to the art, and said fuel nozzle 18 is positioned in front and to the the center of the flared mouth 17 of the 1st stage intake tube 6.

The 3rd stage intage tube 8 has a flame holder 19, in the form of a coiled wire, attached to it, and positioned aft of the end of the intake tube 8, inside the combustion chamber 2. The engine 10 will not operate without the flame holder. Except for the surfaces of the flame holder 19, there exists an unobstructed passage all the way through the engine 10, from the intake duct 5 to the exhaust tail tube 4. This unobstructed passage allows the movement of the fuel-air charge and the combustion products on a common longitudinal axis, thereby increasing the kinetic energy of the fuel-air charge and combustion products, and results in a more effective blocking of backflow of combustion gases and the greater kinetic energy also increases thrust.

Ignition is by means of a spark plug 31, located on, and penetrating the combustion chamber 2. The location of the spark plug 31 is not critical; it may be located anywhere on the engine from the combustion chamber 2 to the the exhaust tail tube 4. The spark plug 31 may be activated by any suitable electrical source.

Engines of this invention are constructed primarily from stainless steel, although other high temperature metals, such as titanium are suitable. The engine 10 illustrated in FIG. 1 was constructed principally from stainless steel.

OPERATION OF THE ENGINE

In placing the engine 10 into operation, the fuel supply valve 13 is opened, and the fuel throttle valve 11 is opened slightly, causing liquid gaseous fuel such as propane or butane to flow from the pressurized fuel tank 12 to the fuel feed line 9, and on to the vaporizer coils 15. The pressure behind the fuel is the pressure supplied by the fuel itself when it is held as a liquid in a closed container. For liquid propane, this pressure is about 100 pounds per square inch at ambient temperature, and for butane this pressure is less. When butane is use, and also for propane, the pressure in the fuel tank 12 may be increased by injecting an inert gas such as nitrogen into the fuel tank 12. Increasing the pressure in the fuel tank 12 allows a higher fuel feed rate, and greater thrust, since increasing the fuel feed rate produces greater thrust. When the spark plug 31 is activated, the engine will instantaneously start. As soon as the engine starts, the spark plug 31 may be turned off, and the engine will continue stable operation. The engine may be run for a minute or two, to warm up, and then it is ready for full operation to full throttle, by opening the fuel throttle valve 11 to its maximum setting. When it is desired to discontunue operation, this is accomplished by simply completely closing the throttle valve 11. To restart the engine 10, the throttle valve 11 is reopened, and the spark plug 31 momentarily reactivated. Restart is instantaneous, and again results in stable operation.

Referring to the operation of the engine 10, detailed descriptions of the dynamic processes that are occurring inside the engine during operation to control combustion and cause jet thrust are as follows: As the the fuel supply valve 13 and fuel throttle valve 11 are opened, liquid propane or butane is forced through the vaporizer coils 15 all the way to the supersonic fuel nozzle 18, where the liquid fuel is released under atmospheric pressure as a vapor, and then is injected directly into the the flared mouth 17 of the 1st stage intake tube 6. As it enters the intake tube 6, it pulls air into the intake tube 6 through the process of aspiration. Air is mixed into the fuel inside the intake tube 6, and then this fuel-air mixture is injected into the 2nd stage intake tube 7, where more air is aspirated into the fuel-air mixture at the flared mouth 22 of the intake tube 7. The process is repeated at the flared mouth 23 of the 3rd stage intake tube 8, and then the final mixture of air and fuel enters the combustion chamber 2. At this point, the vaporized fuel is highly enriched with air and is highly combustible. The spark plug 31 is momentarily activated, causing the fuel-air charge to ignite. An explosion occurs, causing heat and a pressure rise in the combustion chamber 2. The heat of combustion superheats the vaporizer coils 15, causing said coils 15 to begin vaporizing the liquid fuel inside them. The pressure of combustion acts in all directions inside the engine, including directly against the intake duct 5, where it is shunted and prevented from pushing back into and through the intake duct 5.

The process by which the intake duct 5 blocks the backflow of combustion gases can be explained by several phonemena occurring at one time. It was discovered sometime ago by previous inventors in the art that an intake duct which penetrates the combustion chamber experiences less pressure at its mouth, inside the engine, than an intake duct that is flush with the combustion chamber or positioned just outside the combustion chamber. Most valveless jet engines of the prior art employ a penetrating or entrant intake duct tube combined with sonic tuning, as mentioned above, to reduce backflow of combustion gases through the intake. However, many experiments conducted by this inventor have shown that an entrant intake tube, even when combined with sonic tuning, does not reduce all backflow. Continued experimentaion by this inventor to find a solution has led to the discovery that employing a second intake tube of a smaller diameter inserted into the primary intake tube and also positioned inside the engine works in combination with the primary intake tube to shunt off all backflow, as long as both intakes are positioned inside the combustion chamber as entrant tubes, and the 2nd intake tube has a diameter that is 85–95% of the diameter of the first or primary intake tube, and the insertion inside the combustion chamber is to about half the length of the primary intake tube. In addition, the positive pressure of the fuel-air charge flowing through intake duct has a hammer effect which acts against the blowback of combustion gases. During flight, the effect of ram air acts to increase the fuel-air pressure in the intake duct 5 of engine 10, and further reduces the chance of combustion gases blowing back into the intake duct 5. Under all conditions, static and dynamic flight, fuel delivery to the combustion chamber through the intake duct 5 is stable, and not interrupted by backflow or shock reversals from combustion gases.

With the combustion gases shunted off at the intake duct 5, all the pressure is relieved out the exhaust tail tube 4 at high velocity, causing forward thrust. When the pressure inside the engine drops below the positive pressure in the intake duct 5, another fuel-air charge enters the combustion chamber 2 and is ignited by the flame holder 19 and the combustion process is repeated. The engine 10 functions as a constant flow burner, with fuel, air, and combustion products all moving in one direction, on a common longitudinal axis with a resultant increase in kinetic energy and thrust. Engines of this invention are not limited to liquid gaseous fuels such as propane or butane, but highly volatile hydrocarbons such as gasoline or kerosene may also be employed in the form of a vapor or as a liquid mist.

To utilize these fuels as a vapor, the engine must be equipped with two separate and complete fuel supply means of the same type as on the engine 10 illustrated in FIG. 1. Both fuel supply means will have separate fuel tanks, delivery lines, throttle valves, vaporizer coils, supersonic fuel nozzles, with both fuel nozzles facing the I st stage intake tube 6. The tank holding the gasoline or kerosene liquid must be pressurized with an inert gas, such as carbon dioxide, helium, or nitrogen, or alternatively, a fuel pump may be employed to drive the liquid gasoline or kerosene to the vaporizer coils 15 from a suitable atmospheric liquid fuel tank. The engine is put into operation by first starting and operating the engine on propane or butane until the engine reaches a constant operating temperature, at which time the fuel throttle valve for gasoline or kerosene is opened to begin burning a combination of propane or butane and vaporized gasoline or vaporized kerosene, at the same time. The throttle valve for the propane or butane is then turned to a lower setting, but not off, while the throttle valve for the gasoline or kerosene is opened to a higher fuel flow rate. The propane or butane fuel is utilized to start the engine and raise the temperature of the engine sufficiently high to easily vaporize the gasoline or kerosene in the vaporizer coils, and the propane or butane throttle valve is never shut off because it ensures a positive and stable flow of gasoline or kerosene vapor to the combustion chamber. No illustrations are shown for operating on gasoline or kerosene vapor.

Figure 2:
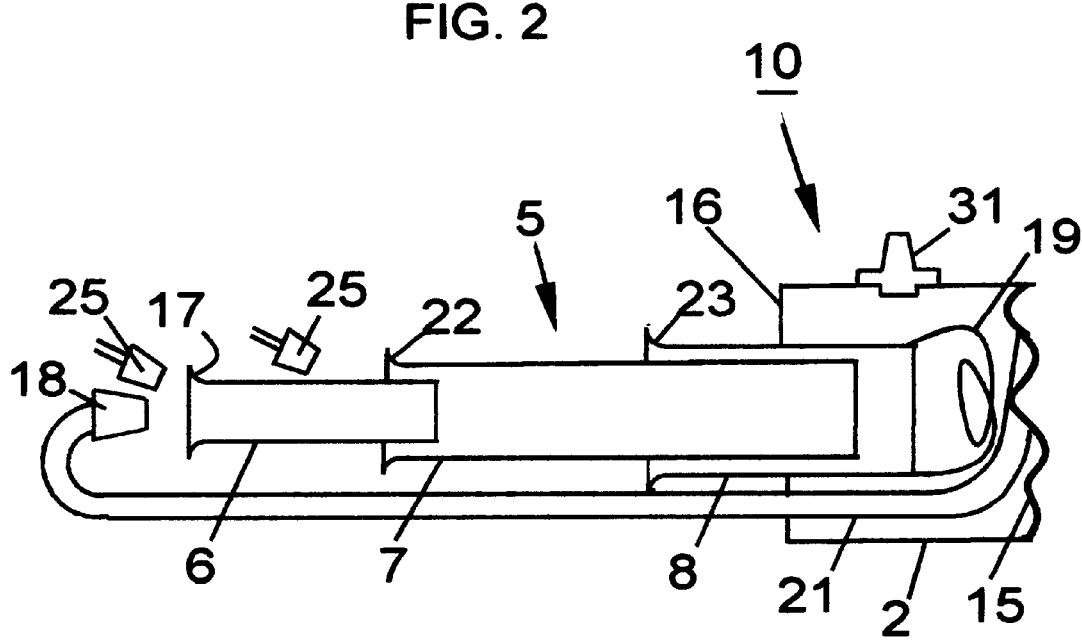
FIG. 2 is a fragmentary longitudinal sectional view, showing a modified form of the engine in FIG. 1, illustrating the addition of liquid fuel spray nozzles.
Figure 3:
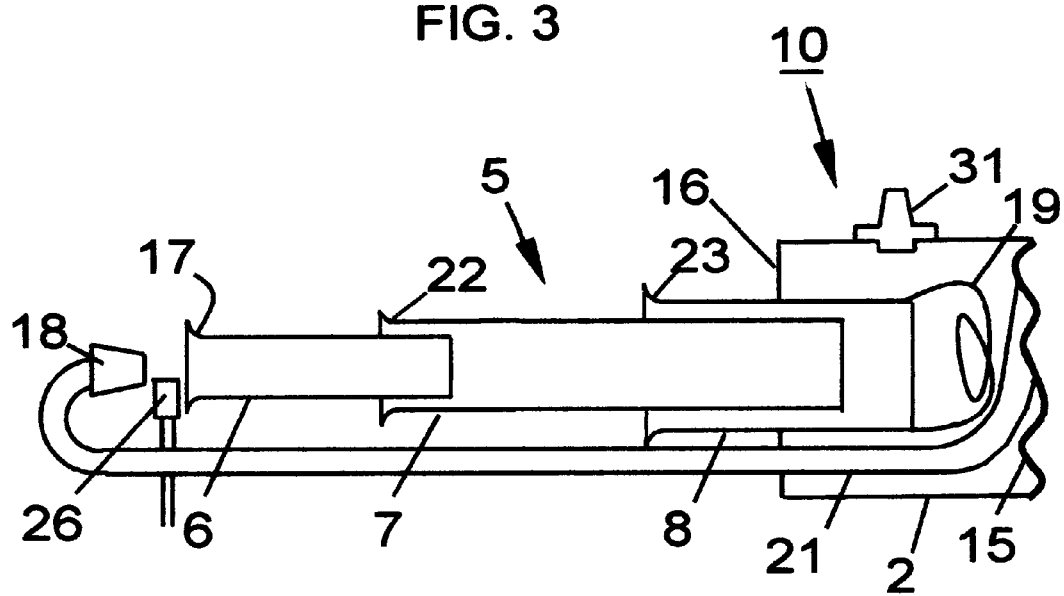
FIG. 3 is a fragmentary longitudinal sectional view, showing another modified form of the engine in FIG. 1, illustrating the addition of a liquid fuel atomizer tube.

FIGS. 2 and 3 illustrate how the engine 10 may be modified to operate on a liquid hydrocarbon mist, such as a gasoline or kerosene mist.

In FIG. 2, there is illustrated engine 10 equipped with liquid spray nozzles 25, postioned at the flared mouths of the 1st stage intake tube 6, and the 2nd stage intake tube 7. Gasoline or kerosene liquid may be pumped through these nozzles 25 with pressure being supplied by a fuel pump, or, alternatively, the fuel may be propelled from a fuel tank pressurized with a suitable inert gas, such as carbon dioxide, helium, or nitrogen gas. A throttle valve may be included between the fuel tank and the spray nozzles 25 to vary the fuel feed rate. Spray nozzles 25 are common in the art; they function to break up the liquid into a dispersion of fine liquid fuel droplets. With the engine operating on propane, it is recommended that spray nozzles 25 be activated only when sufficient forward flight has been attained, to prevent fuel flooding. Forward flight causes ram air to increase the quantity of air entering the intake duct 5;, so flooding does not occur. When sufficient forward velocity has been attained, it is possible to completely close the propane or butane throttle valve, and operate only on a gasoline or kerosene mist and air entering the intake duct 5. At the point when the engine is operating only on a liquid hydrocarbon mist through the spray nozzles 25, it essentially becomes a ramjet, and has the potential of attaining very high forward speed. Employing separate liquid fuel nozzles 25 works better for larger engines.

In FIG. 3 there is illustrated engine 10, equipped with a novel method of fueling, employing propane or butane to atomize a volatile hyrocarbon liquid such as or kerosene or gasoline, and spray a combination of propane or butane and atomized liquid hydrocarbon into the intake duct 5. This method of atomization is common for atomizing spray paints, and works well here for atomizing the liquid hydrocarbon and spraying it into intake tube 6. The hydrocarbon liquid fuel, such as gasoline or kerosene is held in a suitable tank at atomospheric pressure, and drawn up to the atomizer tube 26 by a suction created when the propane or butane vapor from the supersonic fuel nozzle 18 blows across the mouth of the atomizer feed tube 26. The propane or butane vapor acts to break up the liquid fuel from the atomizer tube 26 into fine droplets dispersed into the propane or butane vapor. A throttle valve may be utilized between the atomizer tube 26, and the fuel tank to vary the fuel feed rate to the atomizer tube 26. This technique has been successfully tested many times and works well with smaller engines.The benefit of this fueling method is it reduces the quantity of propane or butane required for operating the engine, thereby reducing the size of the heavier pressure fuel tank for holding liquid propane or butane, and utilizing a simple lighter weight, low pressure fuel tank for holding liquid hydrocarbon fuel such as kerosene or gasoline liquid.

Figure 4:
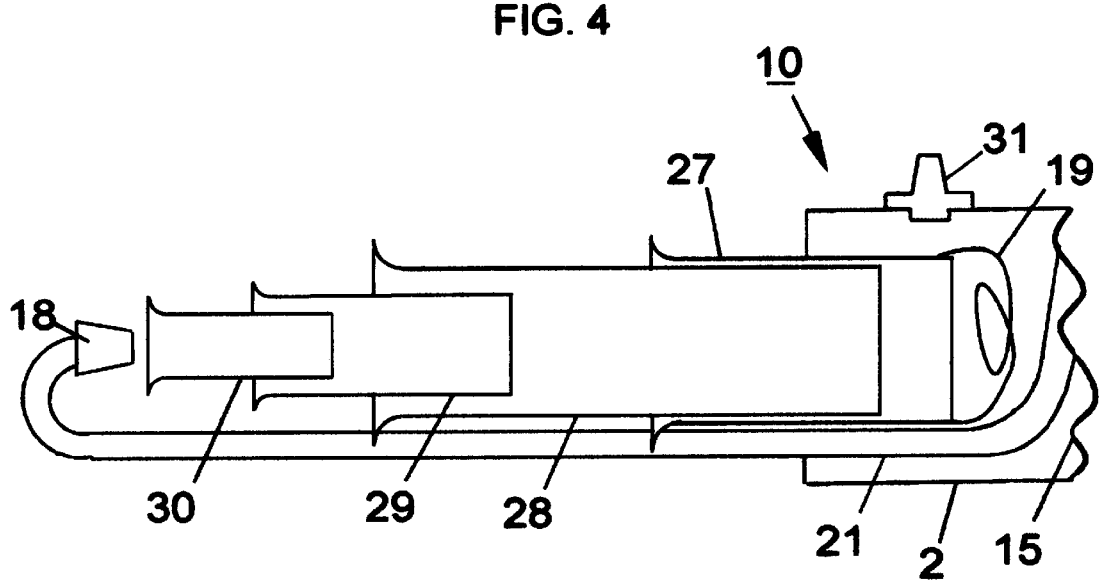
FIG. 4 is a fragmentary longitudinal sectional view, showing still another modified form of the engine in FIG. 1, illustrating an intake duct comprising four intake tubes.

Engines of this invention are not limted to three intake tubes per intake duct, but may have as many as five intake tubes in the intake duct. Additional intake tubes of smaller diameter may be added at the forward end of the intake duct. Each additional intake tube shall have a smaller diameter than the intake tube just aft of it, a length of one-half to one times the length of the intake tube behind and to the aft of it, and be partially inserted in the intake tube behind and to the aft of it. There is illustrated in FIG. 4 engine 10 equipped with an intake duct consisting of four intake tubes, 27, 28, 29, and 30. Operation of this engine is the same as the engine 10 illustrated in FIG. 1. Each additional intake tube in the intake duct provides another air dilution stage to further increase the air-fuel ratio and permit a higher throttle setting.

Engines of this invention are not limited to one intake duct but may have as many as seven intake ducts. When utilizing more than one intake duct, the requirement of this invention is that the sum of the cross-section areas of all the primary intake tubes joined to the combustion chamber must not be less than 25% nor more than 100% of the cross-section area of the exhaust tail tube. The benefit of multiple intake ducts is to decrease the diameters of the intake tubes and supersonic fuel nozzles. Multiple intake ducts may be fueled by one fuel supply means with a separate supersonic fuel nozzle for each intake duct, and a suitable method to distribute fuel to each supersonic fuel nozzle from one fuel tank. No illustrations of engines with multiple intake ducts are shown. Multiple intake ducts work better with larger engines.

With the intake tubes and their associated inlet mouths facing forward to maximize the effects of ram air, and with up to five intake tubes per intake duct specified, engines of this invention have superior air-handling capacity, and are capable of throttling 2–3 times higher than any previously known valveless jet engine. High engine thrust is developed by the ability of the engines to capture sufficient air to meet the oxidation requirements of a high fuel burn rate. This is accomplished without any moving parts or need for a compressor. Engines of this invention develop both high static thrust and high dynamic thrust, featuring characteristics of both valveless jet engines and ram jets. As such, they are novel, and represent a significant advancement in valveless jet engine technology.

While in the foregoing specification an embodiment of the invention has been set forth in considerable detail for the purposes of making a complete disclosure thereof, it will be apparent to those skilled in the art that numerous changes may be made in such details without departing from the spirit and principles of the invention.

What is claimed is:

1. A self starting, self-aspirating valveless jet engine, comprising:

(a) a combustor tube consisting of a combustion chamber closed at its forward end by a flat or covex face, said combustion chamber communicating with an exhaust tail tube by way of an intermediate reducing cone, said exhaust tail tube open to the atmosphere at its aft end and of a smaller diameter than the combustion chamber, with the combustion chamber, reducing cone, and exhaust tail tube all arranged on a common longitudinal axis, (b) an intake duct to capture air, and mix it into the vaporized fuel, and feed the fuel-air mixture to the combustion chamber, said intake duct penetrating the forward face of the combustion chamber at its center, said intake duct positioned on a common longitudinal axis with the combustor tube, and comprising of three to five intake tubes of varying diameters, wherein each tube is flared at its forward end to form an enlarged mouth which faces the direction of flight, said intake tubes arranged in order of increasing diameter with the smaller diameter tubes at the forward end of the intake duct and each intake tube, except the last two aft intake tubes, partially inserted inside the forward end of the intake tube behind and to the aft of it, with the last tube in the sequence being the primary intake tube having a length equal to the diameter of the combustion chamber, and a cross-section area of 25–100% of the cross-section area of the exhaust tail tube, said primary intake tube penetrating the forward face of the combustion chamber at its center and integrally joined to the forward face of the combustion chamber around the circumference of said primary intake tube, said primary intake tube extending into the combustion chamber to a length approximately equal to 50% of the diameter of the combustion chamber, with the adjacent intake tube just forward of the primary intake tube having a length of 1.25–2.0 times the length of said primary intake tube, a diameter of 85–95% of the said primary intake tube, and inserted inside the primary intake tube and extending into the combustion chamber to a length of 25–37.5% of the diameter the combustion chamber, each remaining intake tube in the intake duct, forward of the last two aft intake tubes, having a length equal to one-half to one times the intake tube behind and to the aft of it, and all the intake tubes in the intake duct arranged with their centers aligned, (c) a flame holder, comprising a coiled wire or suitable solid surface of minimum cross section, positioned inside the combustion chamber, adjacent to the aft end of the primary intake tube so said flame holder comes in contact with the fuel-air mixture as it enters the combustion chamber to ignite it, (d) a fuel supply means comprising a fuel tank capable of retaining liquified gaseous hydrocarbon fuel, a suitable means to fill the tank and draw liquid from the tank, a fuel supply or tank valve leading to a fuel line of lesser diameter than a vaporizer tube and vaporizer coils downstream, said fuel line feeding to a throttle valve to vary the liquid fuel feed rate to the vaporizer tube, said vaporizer tube penetrating the wall of the combustion chamber and extending inside the combustion chamber where said vaporizer tube is coiled to form a series of vaporizer coils which superheat the liquid fuel, transforming it into a vapor which flows through a straight section of the vaporizer tube, said straight section of the fuel line extending out the combustion chamber to the atmosphere through a small hole in the combustion chamber, where it is fitted at its end with a supersonic fuel nozzle which is positioned directly in front and at the center of the mouth of the first forward intake tube and, (e) a spark plug for igniting the fuel-air mixture, said spark plug located anywhere on the combustor tube, and activated by a suitable electrical source.

2. The jet engine according to claim 1, wherein the fuel-air mixture is delivered to the combustion chamber by more than one intake duct but not more than seven intake ducts, said intake ducts being of the same type as specified in claim 1, said intake ducts spaced equally on the front face of the combustion chamber, said intake ducts meeting the requirement that the sum of the cross-section areas of all of the primary intake tubes must be at least 25% but not more than 100% of the cross-section area of the exhaust tail tube, and all the intake ducts are fueled by one fuel supply means of the same type as specified in claim 1, except that each intake duct is fed by a separate supersonic fuel nozzle with suitable method to distribute the vaporized fuel from one series of vaporizer coils to each supersonic fuel nozzle.

3. The jet engine according to claim 1, wherein a second fuel supply means is included to feed a vaporized volatile liquid hydrocarbon as a second fuel to the intake duct, said fuel supply means consisting of a means to supply the liquid fuel under pressure so as to drive the fuel to a fuel line of lesser diameter than the vaporizer tube and series of vaporizer coils downstream, said fuel line feeding to a throttle valve to vary the liquid fuel feed rate to the vaporizer tube, said vaporizer tube penetrating the wall of the combustion chamber where it forms a series of vaporizer coils which superheat the liquid fuel transforming it into a vapor which flows through a straight section of the vaporizer tube, said straight section extending out the combustion chamber through a small hole in the combustion chamber where it is fitted at its end with a supersonic fuel nozzle positioned directly in front and near the center of the mouth of the first forward intake tube of the intake duct.

4. The jet engine according to claim 2, wherein all the intake tubes are fed at the same time by one additional fuel supply means to feed a vaporized volatile liquid hydrocarbon as a second fuel to each intake duct, said fuel supply means consisting of a means to supply the liquid fuel under pressure so as to drive the fuel to a fuel line of lesser diameter than the vaporizer tube and series of vaporizer coils downstream, said fuel line feeding to a throttle valve to vary the liquid fuel feed rate to the vaporizer tube, said vaporizer tube penetrating the wall of the combustion chamber where it forms a series of vaporizer coils which superheat the liquid fuel transforming it into vapor which flows through a straight section of the vaporizer tube, said straight section extending out the combustion chamber to the atmosphere where it leads to a suitable distribution means to equally divide the fuel vapor and feed each divided vapor portion to each additional supersonic fuel nozzle positioned directly in front and near the center of the mouth of the first forward intake tube of each intake duct.

5. The jet engine according to claim 1, wherein the engine has an additional fuel supply means to feed a volatile liquid hydrcarbon fuel mist into the intake duct, said fuel supply means consisting of one or more liquid fuel spray nozzles positioned at any of the inlet mouths of the intake tubes of the intake duct, except at the inlet mouth of the primary intake tube, said fuel spray nozzles being fed from a supply of volatile liquid hydrocarbon fuel under pressure, including a throttle valve to vary the fuel feed rate, and a suitable means to equally distribute the liquid fuel to the fuel spray nozzles.

6. The jet engine according to claim 2, wherein the engine has an additional fuel supply means to feed a volatile liquid hydrocarbon fuel mist to all of the intake ducts at the same time, said fuel supply means consisting of one or more liquid fuel spray nozzles positioned at any of the inlet mouths of the intake tubes of the intake ducts, except at the inlet mouth of any primary intake tube, said fuel spray nozzles being fed from a supply of volatile liquid hydrocarbon fuel under pressure, including a throttle valve to vary the fuel feed rate to all of the fuel spray nozzles at the same time and a suitable means to equally distribute the liquid fuel to the fuel spray nozzles.

7. The jet engine according to claim 1, wherein the engine has an additional fuel supply means to feed a volatile liquid hydrocarbon fuel mist into the first forward intake tube of the intake duct, said fuel supply means consisting of an atomizer nozzle positioned at a 90 degree angle to the supersonic fuel nozzle, to atomize the volatile liquid hydrocarbon fuel as gaseous hydrocarbon fuel vapor from the supersonic fuel nozzle passes over the mouth of the atomizer nozzle, causing a mixture of atomized volatile liquid hydrocarbon fuel mist and gaseous hydrocarbon fuel to enter into the mouth of the first forward intake tube of the intake duct, said atomizer nozzle being fed from a supply of volatile liquid hydrocarbon fuel, including a throttle valve to vary the fuel feed rate, said throttle valve positioned between the liquid hydrocarbon fuel supply and the atomizer nozzle.

8. The jet engine according to claim 2, wherein the engine has an additional fuel supply means to feed a volatile liquid hydrocarbon fuel mist into the first forward intake tube of each intake duct, all of the intake ducts being fed at the same time, said fuel supply means consisting of an atomizer nozzle positioned at a 90 degree angle to each supersonic fuel nozzle, to atomize volatile liquid hydrocarbon fuel as gaseous hydrocarbon fuel from each supersonic fuel nozzle passes over the mouth of each atomizer nozzle, causing a mixture of atomized volatile liquid hydrocarbon fuel mist and gaseous hydrocarbon fuel to enter the mouth of each first forward intake tube of each intake duct, said atomizer nozzles being fed from one supply of volatile liquid hydrocarbon fuel, including a means to equally distribute the volatile liquid hydrocarbon fuel to atomizer nozzles, and a throttle valve to vary the fuel feed rate to all the atomizer nozzles at the same time, said throttle valve positioned between the supply of volatile liquid hydrocarbon fuel and the means of distribution.

\* \* \* \* \*